United States Patent Office 3,488,291
Patented Jan. 6, 1970

3,488,291
PROCESS AND COMPOSITION FOR THE PRODUCTION OF CEMENTED METAL CARBIDES
John F. Hardy, Andover, and Merrill E. Jordan, Walpole, Mass., assignors to Cabot Corporation, Boston, Mass., a corporation of Delaware
No Drawing. Original application Aug. 24, 1964, Ser. No. 392,284, now Patent No. 3,377,141. Divided and this application Apr. 9, 1968, Ser. No. 720,000
Int. Cl. C09k 3/00; C22c 1/04; B22f 1/00
U.S. Cl. 252—301.1
13 Claims

ABSTRACT OF THE DISCLOSURE

The present invention relates to a process for producing metal carbide/free metal compositions useful in powder metallurgy applications. Said process is characterized broadly by the steps of:

(I) providing a mixture comprising
 (1) a liquid medium having dissolved therein
  (A) a metal compound which can be converted to the corresponding metal carbide in the presence of carbon, and
  (B) a metal compound which can be converted to the corresponding free metal in the presence of carbon, and
 (2) carbon black
(II) spray drying said mixture, thereby removing the liquid medium therefrom, and
(III) heat treating the dried product under appropriate conditions to result in the conversion of the metal compound of Group A to the metal carbide and conversion of the metal compound of Group B to the free metal. In addition to the processing ease by which the metal carbide is intimately associated with the free metal a further advantages accrues which is directly attributable to the nature of the spray dried feedstock. Specifically, said spray dried product is substantially more readily converted to the end product metal carbide composition than feedstocks heretofore commonly employed in the art.

---

This application is a division of U.S. application Ser. No. 392,284, filed Aug. 24, 1964, now U.S. Patent No. 3,377,141.

Finely-divided metal carbide powders are well known products of commerce. Such products presently have many known applications and their potential applications are regarded as especially promising. Many processes are known for producing metal carbide powders and, in general, the fineness of the ultimate powder is determined primarily by the particular process utilized. For example, the finer grades of metal carbide powders, i.e. those having average particle diameters below about one micron, are generally produced by reacting metal oxides with carbon and thereafter subdividing the resulting carbide by highly specialized attrition or grinding processes. Accordingly, said finer grades of powdered metal carbides are expensive because of the intricate aftertreatment processes involved in producing them.

In many applications it is desirable that the finely-divided metal carbide powders be intimately mixed/or coated with free metal powders. Thus, the production of such finely-divided metal carbide/metal compositions is generally even more expensive than the production of metal carbide powders alone because of the requirement for an added and critical step of mixing or coating the metal carbide powder. Heretofore, said mixing and/or coating step has been conventionally accomplished by prolonged ball milling of a mixture of the metal carbide powder and the free metal powder in the desired proportions. The resulting composition is then formed, compacted and sintered to form the desired end product. Depending upon the ratio of metal carbide to free metal, these compositions are generally referred to either as cemented carbides or dispersion strengthened alloys. In view of the growing interest in finely-divided metal carbide/free metal compositions, especially those having average particle diameters below about one micron, any process whereby such compositions can be produced in a simple and inexpensive fashion would indeed by a notable contribution to the art.

A principal object of the present invention is to provide an improved process for making the foregoing contribution to the art.

Specifically, it is a prime object of the present invention to provide a method for producing finely-divided metal carbide/free metal compositions in an extremely economical fashion.

Still another object of the present invention is to provide a process for the production of finely-divided metal carbide/free metal compositions in which the constituents are unusually intimately and uniformly admixed.

It is a further object of the invention to provide novel feedstocks for subsequent conversion to powdered metal carbide/free metal compositions.

Other objects and advantages of the present invention will in part be obvious to those well skilled in the art and will in part appear hereinafter.

In a very broad sense, the above-mentioned objects and advantages are realized in accordance with the practice of our invention by preparation of a feedstock mixture comprising a liquid medium, carbon black and at least two different metal compounds dissolved in said medium; removing the liquid medium from said mixture by spray drying and converting the dried product in a heated environment suitable for converting the metal compounds therein to the corresponding metal carbide and free metal.

Broadly, the metal compounds included within the scope of the present invention are those selected from two groups. One group includes metal compounds which can be converted in the presence of carbon to the corresponding metal carbide. Typical metal compounds included within this group are compounds of metals such as chromium, tungsten, boron, thorium, titanium, silicon, zirconium, tantalum, hafnium, uranium, vanadium, niobium, molybdenum, and mixtures of these. Hereinafter, the compounds of this group of metals will be referred to as the compounds of "Group A."

The remaining group of metal compounds of interest, i.e. those compounds intended to form part of the feedstock mixture with the compounds of Group A, broadly comprise those metal compounds which can be converted in the presence of carbon to the corresponding free metal. This group includes compounds of copper, zinc, nickel, cobalt, iron, tin, manganese, etc. Of particular interest are compounds of cobalt, nickel and iron. Hereinafter, the compounds of this group of metals will be referred to as the compounds of "Group B."

The metal compounds to be utilized can generally comprise any organic, inorganic or complex salts. Particularly suitable are the water soluble salts of the above-mentioned metals. Representative compounds of both Group A and B metal compounds include sulfates, chlorides, bromides, oxides, iodides, fluorides, nitrates, perchlorates, sulfides, acetates, citrates, oxalates, formates, benzoates, carbonates, oleates, and tartrates.

It is to be understood that the proportion of metal carbide to free metal in the final composition is largely predetermined by the proportion of Group A and B metal compounds present in the feedstock mixture. Obviously, said proportion can be selectively adjusted during the formation of said feedstock mixture. For example, metal carbide/free metal compositions of the present invention containing less than about 15% by weight metal carbide can be regarded as dispersion strengthened alloys. Also, metal carbide/metal compositions containing between about 1 to about 50% by weight free metal can be fabricated into articles known to the art as cemented carbides.

It is all important that the metal compounds forming part of the feedstock mixture be in solution form. Thus, the choice of metal compounds and liquid media to be utilized in forming the feedstock mixture will obviously be interdependent and will be dictated, to a large extent, by the solubility characteristics of the metal compound ingredients. Generally speaking, any liquid medium which is inert with respect to the metal compounds and the carbon black, i.e. which does not react deleteriously with the feedstock ingredients (such as by reaction with the metal compound(s) to form a solid product(s)) and which is sufficiently volatile to be removed during the subsequent spray drying step is suitable for use in the process of the present invention. Thus, liquid media such as light hydrocarbons (heptane, hexane, decane, carbon tetrachloride, isopentane); lower alcohols (isopropanol, butanol, methanol ketones (acetone, methyl ethyl ketone) and the like are often suitable. However, due to the many suitable metal compounds soluble therein, the general chemical inertness and ready availability thereof, etc., water is generally much preferred.

For the purposes of the present invention the term, carbon black refers generally to products produced by the incomplete combustion and/or pyrolysis of hydrocarbon materials. Thus, for example, materials referred to in the art as acetylene blacks, lamps blacks, furnace blacks, thermal blacks, channel blacks, etc., are all included within the scope of the present invention.

Our manner of mixing the carbon black with the metal compounds in solution form is considered important since this factor contributes significantly to the further advantage of an unusually facile conversion of the dried feedstock. Thus important principles of our invention reside not only in the particular ingredients utilized in the preparation of the reaction mixture but also in the manner of intimately combining the metal compound ingredients in solution form with carbon black to produce a mixture which is subsequently dried by spray drying and converted in surprisingly easy fashion to metal carbide/free metal compositions wherein the particles, in most cases, have average particle diameters below about 1.0 micron and often below about 0.5 micron.

The exact amount of carbon black to be combined with the metal compounds in solution will be determined primarily by the amount of free carbon desired in the final composition. We consider our process most valuable when applied to the production of finely-divided metal carbide/free metal compositions of high purity, that is to say, compositions containing very small quantities of free carbon, i.e. containing less than about 10 and preferably less than about 0.5% by weight of the total composition of free carbon. Accordingly, in a preferred embodiment of our invention, the amount of black utilized initially will normally be less than the amount required to produce compositions comprising about 10% by weight of free carbon. However, it is to be understood that our process can also be applied to the production of finely-divided metal carbide/free metal compositions comprising larger amounts of free carbon. Such compositions find utility as fillers in elastomeric or plastomeric compositions and can contain up to about 90% by weight of free carbon if desired.

In the practice of our invention wherein the end product compositions are to comprise low concentrations of free carbon, we find that said low concentrations are substantially assured when the dissolved metal compounds are mixed with an amount of carbon black essentially equivalent to the stoichiometric amount required to convert the metal compound of Group A to the carbide and the metal compound of Group B to the free metal. In connection with the foregoing it should be borne in mind that, when the conversion step is to be completed under a reducing atmosphere, it is normally not necessary to provide any carbon values for the conversion of the compound of Group B to the free metal. In any case, excess carbon in the resulting converted product can also be removed by any suitable aftertreatment of the product, such as by a flotation or frothing step, selective oxidation or conversion of the free carbon to a gaseous substance, etc.

Having produced a suitable feedstock mixture comprising carbon black and a solution of the metal compounds of each of Group A and B said mixture is thereafter spray dried. Thereafter, the resulting dry particles are heat treated at temperatures and under atmospheric conditions suitable for conversion of the metal compound of Group A to the corresponding metal carbide and the metal compound of Group B to the corresponding free metal.

The removal of the liquid medium from the feedstock mixture by spray drying contributes materially to the ease and uniformity by which the dried product is subsequently converted to the metal carbide/free metal composition. It is pointed out that spray drying is quite different from conventional drying processes. For example, conventional drying of a mixture would normally proceed by way of evaporation of the solvent from the surface of a presscake and the continuous replacement of this surface solvent by capillary migration of moisture from the interior portions of said cake. Such uneven drying normally gives rise to agglomerates which are non-uniform in both size and composition. In spray drying, however evaporation takes place from uniform droplets surrounded by warm gases. Under such conditions, the resulting dry particles are normally relatively uniform in size and, of equal or even greater importance, have a uniform composition. In existing commercial spray drying equipment, the powdered product obtained by spray drying a solution or mixture is normally characterized by relatively sphercial particles which are usually of a hollow or porous nature. In general, the average particle size of the dried product ranges between about 20 and 60 microns. The relatively small particle size of the spray dried product is another factor which is considered important. A more complete description of the details of commercial spray drying systems can be found in "Design and Use of Spray Dryers," pages 83–88 of Chemical Engineering, Sept. 30, 1963. It is to be understood, however, that the practice of our invention is not restricted solely to the processes and apparatus set forth in the aforesaid article. Instead, by "spray drying," we mean—and intend to include within the scope of the present invention—those drying processes wherein a mixture is subdivided into and maintained as discrete, preferably uniform droplets while conducted through a zone heated to a temperature sufficient to dry same. Especially included are those spray drying processes in which the average particle size of the dried solid product is no greater than about 200 microns.

It should be borne in mind that the conversions of the Groups A and B compounds to their respective corresponding metal carbide and free metal generally proceeds by way of a multistage reaction. In the first stage the metal compounds are converted to their corresponding metal oxide(s). In the succeeding stages the metal oxide formed from the compound of Group A reacts directly with carbon to form the metal carbide and/or is first reduced in the presence of carbon to the free metal which free metal is thereafter carburized. In the case of the metal oxide formed from the compound of Group B the succeeding reaction generally comprises a direct reduction of the oxide to the free metal. Thus, when the Groups A and B metal compounds contain oxygen, a reducing or inert atmosphere is normally suitable for the entire conversion. When, however, either/or both of said compounds does not contain oxygen or when the corresponding oxides are produced only with difficulty, it is preferred to first heat treat the spray dried particles under an oxidizing atmosphere, thereby converting the metal compounds of Groups A and B to their corresponding oxides, and subsequently under an inert or reducing atmosphere to convert the metal oxide(s) formed from the Group A metal compound(s) to the corresponding metal carbide and the metal oxide(s) formed from the Group B metal compound(s) to the corresponding free metal.

We are unable to explain precisely why our manner of combining the ingredients and drying is so advantageous. However, we have found pronounced differences in the physical properties of intermediate mixtures similar to ours but which have been produced by combining the starting ingredients in a different manner. More specifically, we have found that the X-ray diffraction patterns of our dried carbon black/metal compounds feedstock mixtures differ quite distinctly from those of identical mixtures not obtained in accordance with the teachings of our invention. The most striking difference between said patterns resides in a marked suppression of the crystallinity of our mixtures. We believe this reduced or suppressed crystallinity to be a significant factor.

The advantages in the use of lower conversion temperatures and/or shorter reaction times in producing finely-divided metal carbide/metal compositions will be obvious to those skilled in the art. For example, lower conversion temperatures and/or shorter residence times in a conversion zone obviously imply many economic advantages in both the design of apparatus and operations thereof. Even more importantly, the use of lower temperatures and shorter residence times can eliminate or substantially minimize the potential for sintering which is normally an undesirable but inherent feature often encountered in prior art carbothermic conversions of metal compounds to fine particle sized end products. Accordingly, by the practice of our invention, there is provided a highly versatile and an especially simple and economic process for coforming extremely finely-divided metal carbide/metal compositions which have heretofore been produced only by highly elaborate, intricate and/or expensive attrition, mixing and coating techniques.

The temperatures at which conversion of the spray dried mixture takes place can vary substantially. As mentioned hereinbefore, said range includes temperatures substantially below those normally required to confer the metal compounds to the free metal and carbide as well as temperatures that can exceed said normal conversion temperatures by 400 or 500° C. and even more. It should be noted that the conversion is normally both temperature and time dependent. Accordingly, the lower temperatures are of special utility when the conversion is achieved by way of batch type operations. However, a more efficient method of thermally converting the dried feedstock to the metal carbide/metal end product compositions is by way of a continuous process in which the dry particles are conveyed in suspension through a high temperature conversion zone. In such continuous high temperature conversions, it will obviously be desirable to reduce residence time to a minimum.

The conditions existing in the conversion zone at any given time will be determined by many factors such as the amount of carbon black present, the conversion temperature utilized, the environment and the particular metal compounds involved. For example, if the ultimate product is to be a composition of high purity (i.e. low free carbon content) then a reducing environment is usually advantageously employed. An inert atmosphere is also often suitable when the conversion temperature is closely controlled and maintained below or at about the normal conversion temperature of the compound.

The following specific examples of particular embodiments of our invention are given for the purposes of providing a fuller and more complete understanding of some of the operating details of the invention together with many of the advantages to be obtained from practicing same. These examples should be considered as illustrative only and as in no sense limiting the scope of the present invention.

EXAMPLE 1

There was dissolved into 1200 milliliters of distilled water about 273 grams of ammonium paratungstate and about 68 grams of cobalt nitrate. Next, there was mixed into the resulting metallic salt solution about 29 grams of Vulcan 3, an oil furnace carbon black produced by Cabot Corporation. The resulting mixture was then divided into two equal portions hereinafter referred to as Samples 1 and 2 respectively. Sample 1 was poured into an 11 x 14 x 3 inch tray and placed in vacuum oven maintained at about 240° F. for about 24 hours, thereby evaporating the water solvent. Sample 2 was spray dried at a rate of about 100 cc. per minute, an inlet temperature of about 800° F. and an outlet temperature of about 225° F. The spray dried product was examined and found to have an average particle diameter of about 40 microns.

An additional feedstock mixture, hereinafter referred to as Sample 3, was produced by charging about 82.3 grams of tungstic oxide and about 9.8 grams of Vulcan 3 into a ½ gallon ball mill chamber. The mixture was then milled for about 2 hours at about 70 r.p.m. at which point there was additionally charged to the mixture about 105 cc. of a 25 weight percent aqueous solution of cobalt nitrate. Said mixture was then hand stirred for about an additional 10 minutes. Next, the mixture was poured into a pan and dried in accordance with the procedure as set forth hereinabove with respect to Sample 1.

The dried Samples 1, 2 and 3 were then heat treated in an oxygen-free atmosphere for about 120 minutes at about 2000° F. After cooling to about room temperature in the absence of oxygen X-ray diffraction patterns were obtained on each of the heat treated samples and the patterns were examined for the presence of tungsten carbide and cobalt metal. The data appearing in Table I below was obtained:

TABLE I.—X-RAY DIFFRACTION

| Sample No.: | | Wt. percent WC | Wt. percent Co | Total percent WC/Co in composition |
|---|---|---|---|---|
| 1 | Evaporation | 50 | 6 | 56 |
| 2 | Spray drying | 94 | 6 | 100 |
| 3 | Ball milling | 40 | 4 | 44 |

Samples of the converted powders were formed, pressed and sintered in accordance with a standard are recognized technique in order to provide formed wares suitable for metallographic examination. Said examination consisted of preparation by first polishing and lightly etching a surface of each formed ware and thereafter microscopically examining the etched surface. In particular, attention was made to the relative porosities of the examined surfaces because porosity is generally recognized to represent a detrimental property with respect to end use applications of cemented carbide wares. Additionally, the hardness of each of the sintered samples was determined by the Rockwell "A" method. The results of the above tests are reported below in Table II:

TABLE II

| Sintered Sample No.: | Porosity | Hardness Rockwell A |
|---|---|---|
| 1 | High | 55 |
| 2 | Low | 89 |
| 3 | Extreme | 40 |

Substantially the same results and benefits illustrated in the preceding example are obtained when other metal compounds and other carbon blacks are utilized. For instance, the powder metallurgical arts often utilize compositions comprising several metal carbides and metals in combination. Presently, many applications have been developed for powders comprising in combination tungsten carbide, titanium or tantalum carbide, cobalt, nickel and iron. The process of the present invention is also admirably suited for the production of such complex metal carbide/metal compositions as will be illustrated in the following non-limiting example.

EXAMPLE 2

Into about 1000 milliliters of distilled water there is dissolved 273 grams of ammonium paratungstate and about 60 grams of cobalt nitrate. Next, there is mixed into said solution about 45 grams of a channel carbon black. To this mixture there is then charged about 1000 milliliters of an aqueous solution having dissolved therein about 100 grams of triethoxydichlorotantalane and the resulting mixture is spray dried under substantially the same conditions as utilized in the spray drying step of Example 1. The resulting particulate material, having an average particle diameter of about 50 microns, is charged into a graphite boat which is then heated to and maintained at about 2100° F. for a period of about 120 minutes under a blanket of hydrogen. The resulting product is cooled to about room temperature under said hydrogen atmosphere and, upon examination, is found to comprise a powdered material having an average particle diameter of about 800 millimicrons. The extent of conversion is determined by X-ray diffraction and it is found that substantially complete conversion of the tungsten and tantalum salts to the corresponding carbides and of the cobalt salt to the corresponding free metal has occurred. The powdered product, when compacted, formed and sintered, results in wares of excellent quality.

Obviously many changes can be made in the above examples and disclosure without departing from the spirit and scope of the invention.

For instance, the process of the present invention has been shown hereinabove to be highly versatile in the formation of various metal carbide/metal compositions of commercial interest. Accordingly, it is obvious that combinations of metal carbides and metals other than those specifically shown in the examples can also be produced.

Further, while it is generally desirable to mix the carbon black and the metal compounds into a liquid medium and spray dry the resulting slurry, it is obvious that when the carbon black and metal compounds are mixed so that the resulting mixture is initially in the form of an atomizate, further subdivision of said atomizate will be entirely unnecessary.

Finally, it is to be understood that the proportion of free metal to metal carbide in the final composition can be selectively adjusted to conform to a wide range of specifications, including concentration of free carbon if so desired. In particular, however, compositions of the present invention wherein the total metal carbide content is less than about 15% by weight can be regarded as dispersion strengthened alloys. Also, compositions containing between about 50 and about 99 weight percent metal carbide(s) can be construed as cemented carbides, useful for the manufacture of extremely hard, tough wares.

Having described our invention together with preferred embodiments thereof, what we declare as new and desire to secure by U.S. Letters Patent is as follows:

1. A process for producing finely-divided metal carbide/free metal compositions comprising the steps of:
    (I) providing a mixture comprising carbon black and a liquid medium having dissolved therein
        (A) a metal compound which can be converted to the corresponding metal carbide by reaction with carbon, and
        (B) a metal compound which can be converted to the corresponding free metal in the presence of carbon;
    (II) spray drying said mixture; and
    (III) heating the resulting dried particles under suitable conditions of atmosphere and temperature to convert the metal compound of (A) to the corresponding metal carbide and the metal compound of (B) to the corresponding free metal, said heating being carried out at below the sintering temperature of the resulting carbide/free metal composition product.

2. The process of claim 1 wherein said metal compound of (A) is chosen from the group consisting of the compounds of trungsten, molybdenum, chromium, vanadium, boron, thorium, titanium, silicon, zirconium, tantalum hafnium, uranium, niobium and mixtures of these.

3. The process of claim 1 wherein said metal compound of (A) is a tungsten compound.

4. The process of claim 3 wherein said metal compound of (B) is a cobalt compound.

5. The process of claim 1 wherein said metal compound of (A) is a tantalum compound.

6. The process of claim 1 wherein said liquid medium is water.

7. The process of claim 1 wherein said metal compounds of (A) and (B) are chosen from the group consisting of sulfates, nitrates, acetates and chlorides.

8. The process of claim 1 wherein a mixture of metal compounds of (A) are utilized.

9. The process of claim 1 wherein a mixture of metal compounds of (B) are utilized.

10. The process of claim 1 wherein Step III is accomplished in an inert atmosphere.

11. The process of claim 1 wherein Step III is accomplished in a reducing atmosphere.

12. The process of claim 1 wherein the amount of carbon black utilized in Step I is approximately equivalent to the stoichiometric amount required to convert the compound of (A) to the corresponding metal carbide and the compound of (B) to the corresponding free metal.

13. The process of claim 1 wherein the amount of carbon black utilized in Step I is such that the resulting metal carbide/free metal composition product comprises less than about 0.5 weight percent free carbon.

References Cited

UNITED STATES PATENTS

| | | | |
|---|---|---|---|
| 3,013,875 | 12/1961 | Triffleman | 75—203 X |
| 3,157,497 | 11/1964 | Spacil | 75—204 |
| 3,331,783 | 7/1967 | Braun | 23—345 X |

CARL D. QUARFORTH, Primary Examiner

A. J. STEINER, Assistant Examiner

U.S. Cl. X.R.

29—182.8; 75—.5, 203, 204, 211; 264—.5